United States Patent [19]

Okamoto et al.

[11] 4,432,781
[45] Feb. 21, 1984

[54] METHOD FOR MANUFACTURING FUSED QUARTZ GLASS

[75] Inventors: Haruo Okamoto; Motoyuki Yamada, both of Niigata, Japan

[73] Assignee: Shin-Etsu Chemical Co., Ltd., Tokyo, Japan

[21] Appl. No.: 352,856

[22] Filed: Feb. 26, 1982

[30] Foreign Application Priority Data

Mar. 6, 1981 [JP] Japan ................................. 56-32352

[51] Int. Cl.³ ..................... C03B 20/00; C03B 19/00
[52] U.S. Cl. ..................................... 65/18.2; 65/18.3; 65/66; 427/34
[58] Field of Search ..................... 65/18.2, 18.3, 3.12, 65/66, 17; 427/34, 255.1

[56] References Cited

U.S. PATENT DOCUMENTS 4,367,013  1/1983  Guerder et al. ............... 65/18.2 X Primary Examiner—Kenneth M. Schor
Attorney, Agent, or Firm—Toren, McGeady and Stanger

[57] ABSTRACT

The invention provides a novel method for manufacturing fused quartz glass by the decomposition and oxidation of a vaporizable silicon compound such as silicon tetrachloride in a plasma flame according to which the quartz glass rod produced contains a controlled amount of hydroxy groups with high reproducibility. The principle of the inventive method consists in the admixture of gaseous hydrogen chloride into the gaseous reactant mixture or in the plasma-supporting gas as the source for the hydrogen atoms to be converted to the hydroxy groups in place of hydrogen gas or water vapor as the hydrogen source. Good proportionality is established between the concentration of the hydrogen chloride in the gaseous feed and the hydroxy content in the resultant fused quartz glass rod.

3 Claims, 2 Drawing Figures

METHOD FOR MANUFACTURING FUSED QUARTZ GLASS

BACKGROUND OF THE INVENTION

The present invention relates to a method for manufacturing fused quartz glass from a vaporizable silicon compound or, more particularly, to a method for manufacturing fused quartz glass containing a controlled amount of hydroxy groups.

As is well known, the traditional method for the manufacture of fused quartz glass is melting of quartz powder in a oxyhydrogen flame and shaping the molten quartz into desired forms. This method is, however, susceptible to the unavoidable intermixing of various impurities into the fused quartz glass so that, in accordance with the recent demand for fused quartz glass of higher and higher purity, a synthetic method has come into practice in which a halide of silicon such as silicon tetrachloride is subjected to hydrolysis or oxidation to form silicon dioxide and the melt of the thus formed silicon dioxide is deposited on a refractory substrate into a mass of fused quartz glass.

Owing to the excellent optical and chemical properties of fused quartz glass, on the other hand, the fields of application of fused quartz glass have been greatly expanded in recent years including the rapidly developing technology of electronics which requires particularly high purity and uniformity of the fused quartz glass used therein.

The most important matter in respect of the uniformity of the fused quartz glass is the amount of hydroxy groups contained therein. For example, the hydroxy content should be as little as possible in a fused quartz glass to be fabricated into optical fibers since the hydroxy content in the quartz glass is responsible to the increase of the transmission loss of the light through the optical fibers. On the other hand, the hydroxy groups in a quartz glass is effective to increase the resistance of the quartz glass against ionizing radiation so that the material of fused quartz glass to be used in a high intensity radiation field should desirably contain a considerable amount of hydroxy groups as in the window around an atomic reactor. In this connection, it is advantageous to develop a method for manufacturing fused quartz glass according to which the quartz glass product contains hydroxy groups in an amount controlled as exactly as desired while conventional methods are unsatisfactory in respect of the poor reproducibility of the hydroxy content in the fused quartz glass manufactured thereby.

SUMMARY OF THE INVENTION

It is therefore an object of the present invention to provide a novel method for manufacturing fused quartz glass according to which the quartz glass product contains hydroxy groups in an exactly controlled amount.

The method of the present invention for manufacturing fused quartz glass comprises introducing a gaseous mixture of a vaporizable silicon compound, oxygen and hydrogen chloride into a high frequency plasma flame formed with a gas flow of argon and/or oxygen whereby to decompose the silicon compound into molten silicon dioxide and depositing the molten silicon dioxide on a substrate.

DETAILED DESCRIPTION OF THE PREFERRED EMBODIMENTS

There is proposed a method for manufacturing fused quartz glass containing substantially no hydroxy groups (see, for example, Japanese Patent Publication No. 48-16330) by oxidizing a volatilizable halide of silicon into silicon dioxide and depositing the molten silicon dioxide on a substrate in which hydrogen is excluded from the silicon halide as the starting material as well as the gas flow at high temperatures to oxidize the silicon halide.

On the other hand, there has been proposed no method for freely controlling the hydroxy content in the fused quartz glass manufactured by the method. In this regard, the inventors have conducted extensive investigations to develop a method for freely and exactly controlling the hydroxy content in the fused quartz glass and arrived at a discovery that, when hydrogenchloride is used as the source of hydrogen to be converted into hydroxy groups by reacting with the oxygen existing in the reaction system, hydroxy groups can be introduced into the fused quartz glass and the content of the hydroxy groups in the quartz glass is exactly proportional to the amount of the hydrogen chloride added so that the hydroxy content in the quartz glass can be freely and exactly controlled by adjusting the amount of the hydrogen chloride leading to the establishment of the present invention.

The above described principle of the inventive method means that, when fused quartz glass is manufactured from a volatilizable silicon compound, such as halides of silicon, as the starting material, the volatilizable silicon compound or the silicon halide should not be a compound containing a hydrogen atom or hydrogen atoms in the molecule such as trichlorosilane $SiHCl_3$ or, even when the volatilizable silicon compound is a compound containing no hydrogen atoms in the molecule, such as silicon tetrachloride $SiCl_4$, hydrogen gas should not be used as the carrier gas since the hydrogen atoms in the volatilizable silicon compound or the hydrogen gas as the carrier are oxidized by the oxygen gas in the reaction system into water $H_2O$ which is taken up by and fixed in the quartz glass in the form of hydroxy groups or the thus formed water reacts in the gaseous state with the silicon halide or the halogenosilane to form silanol groups, i.e. hydroxy groups directly bonded to the silicon atoms, which are subsequently introduced into and fixed in the fused quartz glass whereas the amount of the hydroxy groups incorporated into the quartz glass by such a mechanism is not reproducible being affected by various parameters such as the kind of the silicon halide, reaction temperature, gaseous pressure and the like and not proportional to the content of the hydrogen in the reaction system.

Figure 1:
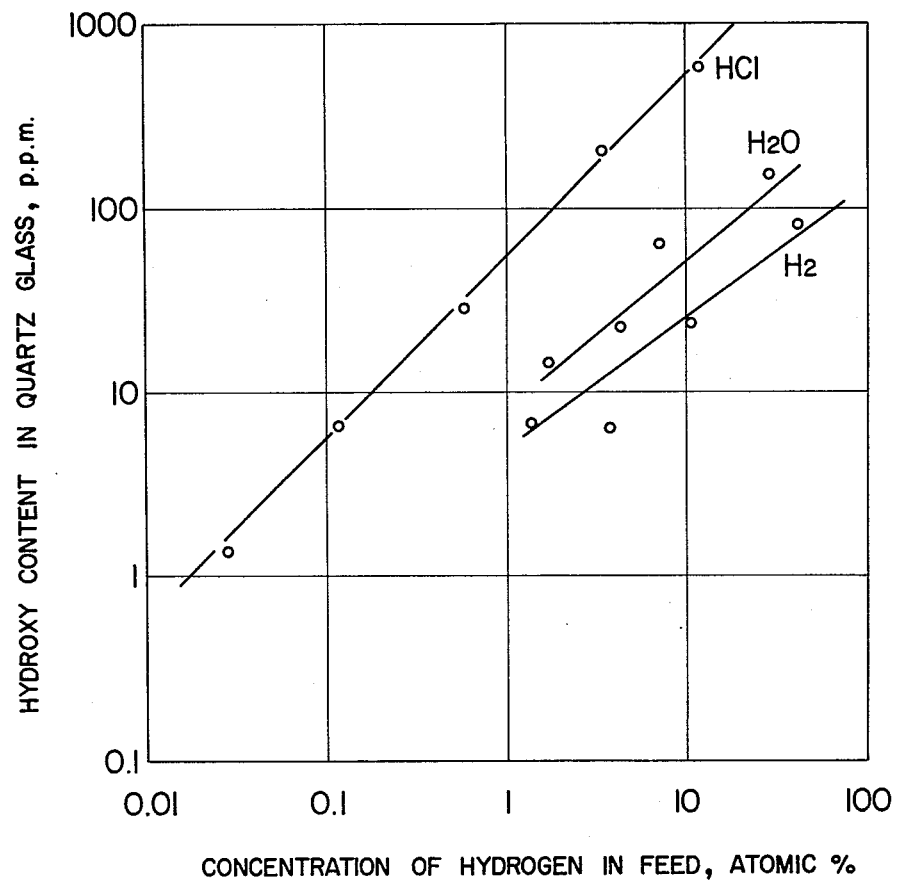
FIG. 1 is a graphic showing of the relationships between the amount of addition of the hydrogen source in the feed gas and the hydroxy content in the resultant fused quartz glass formed in the plasma flame.

In view of the above described difficulties in controlling the hydroxy content in the fused quartz glass, the inventors have conducted several experiments to establish the relationships between the hydroxy content of the quartz glass and the concentration of hydrogen in the gaseous feed mixture introduced into the reaction system in the form of various kinds of hydrogen-containing compounds or hydrogen gas. The results obtained in these experiments are shown in FIG. 1 illustrating the relationships in a logarithmic plot taking the hydroxy content in the quartz glass as the ordinate and the content of hydrogen in atomic percent in the gaseous feed in the abscissa for the cases where the hydrogen source was supplied in the form of hydrogen chloride, hydrogen or water. The straight lines indicated by HCl, $H_2$ and $H_2O$ correspond each to one of these hydrogen-source components, respectively.

As is understood from the straight lines plotted on the figure, the experimental data obtained with hydrogen chloride fit the straight line with minimum errors indicating that the relationship is little influenced by other conditions and the hydroxy content in the quartz glass is determined solely by the hydrogen content in the feed. In addition, the straight line HCl intersets the axis of ordinate or abscissa at an angle of about 45° which means that the hydroxy content in the quartz glass is directly proportional to the hydrogen concentration in the feed.

On the other hand, the experimental data represented by the straight lines $H_2$ or $H_2O$ scattered considerably suggesting the difficultly in controlling the hydroxy content in the quartz glass by adjusting the hydrogen concentration in the feed when the hydrogen source is hydrogen gas or water. Moreover, the straight lines $H_2$ and $H_2O$ do not intersect the axis of ordinate or abscissa at an angle of 45° indicating that the relationships are not directly proportional. Therefore, it is very difficult to obtain a well-controlled hydroxy content in the quartz glass consistent with the desired target content by the interpolation or extrapolation of the graph due to the poor controllability.

Figure 2:
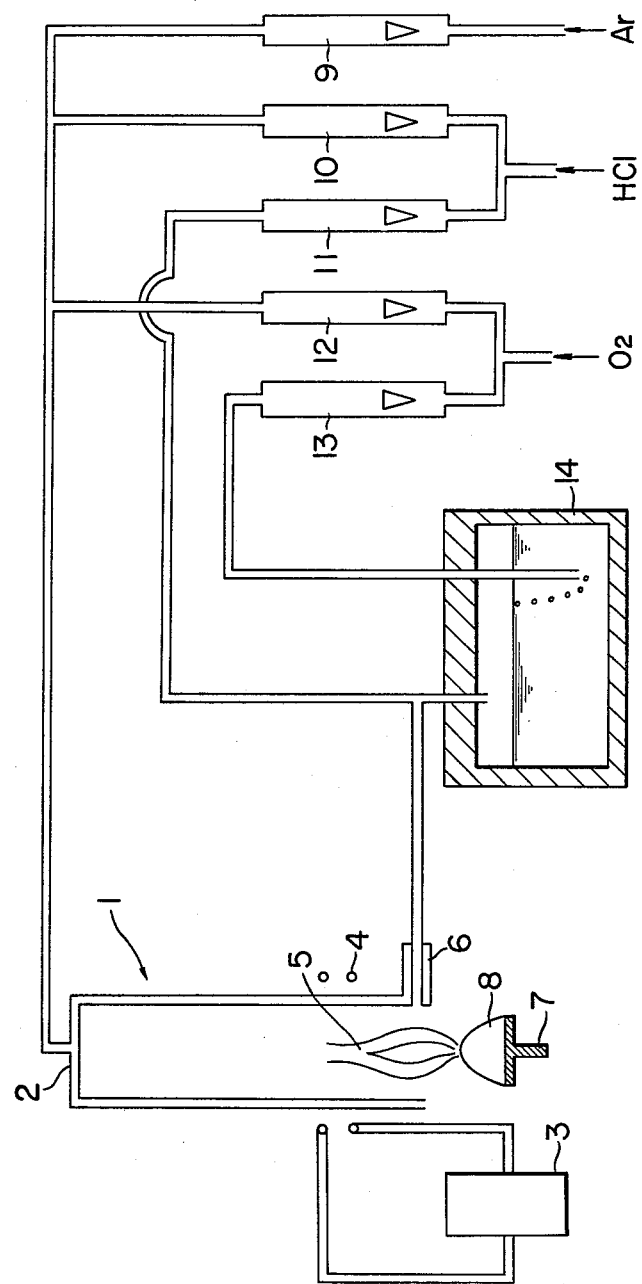
FIG. 2 is a schematic illustration of the reaction system used in carrying out the method of the present invention.

FIG. 2 is a schematic flowsheet illustrating the method of the present invention, with reference to which the inventive method is described below in further detail. The plasma torch 1 is provided with a gas inlet 2 at the top for introducing the gas for plasma generation and surrounded by a high frequency work coil 4 connected to the high frequency generator 3. When the generator 3 is operated, a plasma flame 5 is formed in the lower part of the plasma torch 1 and the gas flow of the starting material is blown at the lower end of the plasma flame 5 through the gas supplying nozzle 6. The volatilizable silicon compound contained in the gas flow through the nozzle 6 and blown at the plasma flame 5 is immediately oxidized by the plasma flame 5 into silicon dioxide to be melted as formed and the thus molten silicon dioxide is deposited on the refractory substrate 7 to form a mass of fused quartz glass 8 thereon.

The plasma-supporting gaseous mixture introduced from the gas inlet 2 is composed of argon, oxygen and hydrogen chloride each at a controlled flow rate through the respective rotameter 9, 12 or 10 and combined together before being introduced into the plasma torch 1 while the vaporizable silicon compound as the starting material of the quartz glass contained in the bubbler 14 and kept at a constant temperature is vaporized and carried by the carrier gas which is the oxygen gas through the rotameter 13 and intermixed with the hydrogen chloride gas coming through the rotameter 11 on the way to the gas supplying nozzle 6.

In this manner, the formation of the fused quartz glass proceeds by the reaction to which the silicon compound, oxygen and hydrogen chloride pertain and the fused quartz glass 8 deposited on the substrate 7 contains a controlled amount of the hydroxy groups corresponding to the amount of the hydrogen chloride introduced into the plasma torch 1. In this case, the hydroxy content in the quartz glass is dependent solely on the amount of the hydrogen chloride, the other conditions being the same, and can be estimated beforehand from the relationship therebetween as shown in FIG. 1.

In the inventive method, the conversion of the volatilizable silicon compound into silicon dioxide and vitrification of the silicon dioxide by fusion take place in the flame of high frequency plasma which is formed by a conventional method known in the art without particular limitations except that the plasma-supporting gas is argon gas, oxygen gas or a mixture thereof. No hydrogen gas should be mixed with the plasma-supporting gas.

The volatilize silicon compound as the starting material of the fused quartz glass is a silane compound represented by the general formula $R_nSiX_{4-n}$, in which R is an alkyl group, phenyl group or hydrogen atom, X is a halogen atom or alkoxy group and n is an integer from 0 to 4. Exemplary of such a silane compound are halogenosilanes such as silicon tetrachloride $SiCl_4$, trichlorosilane $SiHCl_3$, dichlorosilane $SiH_2Cl_2$ and the like and organochlorosilanes such as dimethyldichlorosilane $(CH_3)_2SiCl_2$, methyldichlorosilane $(CH_3)HSiCl_2$ and methylalkoxysilane such as methyl trimethoxy silane $CH_3Si(OCH_3)_3$ and the like. Among the above named silane compounds, the organochlorosilanes are less preferred because of the possibility of formation of free carbon by the thermal decomposition and those silane compounds containing hydrogen atoms are also less preferred because of the danger of explosion as well as the adverse influence on the exactness of the hydroxy content in the fused quartz glass so that the most preferable silane compound is silicon tetrachloride. As is well known, silicon tetrachloride is liquid at room temperature boiling at 60° C. so that it must be vaporized in order to be brought into contact with the plasma flame as being carried by the carrier gas such as oxygen admixed with hydrogen chloride. Vaporization of silicon tetrachloride can be conveniently performed by bubbling the carrier gas into the liquid silicon tetrachloride contained in a bubbler as shown in FIG. 2.

The hydrogen chloride to be added to the silane compound according to the inventive method may be admixed either with the plasma-supporting gas or with the carrier gas for carrying the silane vapor. The amount of the hydrogen chloride to be added should be determined by taking thhe target content of the hydroxy groups in the fused quartz glass into account, which can be exactly controlled in the range from 1 to 1000 p.p.m. by suitably adjusting the amount of addition of the hydrogen chloride.

In summary, the method of the present invention can provide a means for controlling the hydroxy content in the fused quartz glass within the above mentioned range with a sufficiently small variation of, for example, ±5% or smaller so that the advantages obtained by the inventive method are very great when it is desired to manufacture easily and continuously quartz glasses of various hydroxy contents in accordance with the requirement in the application thereof.

Following are the examples to illustrate the method of the present invention in further detail.

EXAMPLE 1

Gases of argon and oxygen were introduced into a plasma torch at flow rates of 15 liters/minute and 20 liters/minute, respectively, and plasma flame was generated in the plasma torch by energizing a high frequency generator of 10 kilowatts output at a frequency of 4 MHz. A gaseous reactant mixture composed of silicon tetrachloride, oxygen and hydrogen chloride each at a flow rate of 0.5 liter/minute, 1.5 liters/minute and 0.206 liter/minute, respectively, corresponding to the hydrogen content of 0.958 atomic % based on the overall supply of oxygen was blown at the plasma flame and the silicon dioxide thus formed and molten in the plasma flame was deposited on the top of a quartz glass rod of 10 mm diameter as the substrate held upright just below the plasma flame. After 5 hours of a continuous operation of the run in this manner, a quartz glass rod of 50 mm diameter and 54 mm height was obtained on the substrate rod at a growth rate of 48 g/hour.

The quartz glass block thus obtained was analyzed for the content of the hydroxy groups to find that the hydroxy content in the core portion was 53 p.p.m. while the content in the skin layer was 48 p.p.m. with a variation well within the desired range of the deviation of a few percent from the target content of 50 p.p.m.

EXAMPLE 2

The experimental procedure was substantially the same as in the preceding example except that the flow rate of the hydrogen chloride gas was increased to 0.426 liter/minute corresponding to the hydrogen content of 1.98 atomic % based on the overall supply of oxygen in accordance with the increased target content of the hydroxy groups of 100 p.p.m. After 5 hours of the continuous operation of the run, a quartz glass rod of 50 mm diameter and 57 mm height was obtained at a growth rate of 46 g/hour. The hydroxy content of this quartz glass rod was 103 p.p.m. in the core portion and 98 p.p.m. in the skin layer indicating sufficiently small deviations from the target content.

COMPARATIVE EXAMPLE

The same experimental procedure as in Example 1 was repeated except that the hydrogen chloride in Example 1 was replaced with 3.10 liters/minute of hydrogen gas or 0.952 liter/minute of water vapor with a target concentration of 50 p.p.m. of the hydroxy groups in the resultant fused quartz glass rod. The actual hydroxy content of the quartz glass obtained after 5 hours of continuous operation was 65 p.p.m. in the core portion and 60 p.p.m. in the skin layer in the case with hydrogen gas as the hydrogen source and 47 p.p.m. in the core portion and 38 p.p.m. in the skin layer in the case with the water vapor as the hydrogen source deviating considerably from the target concentration.

When the flow rate of the water vapor was increased to 2.04 liters/minute with an increased target concentration of the hydroxy groups in the resultant quartz glass of 100 p.p.m., the actual hydroxy content was 130 p.p.m. in the core portion of the quartz glass rod and 140 p.p.m. in the skin layer.

What is claimed is:

1. A method for manufacturing fused quartz glass with a controlled amount of hydroxy groups which method comprises admixing gaseous hydrogen chloride and oxygen with the vapor of a vaporizable silicon compound to form a gaseous reactant mixture, blowing the gaseous reactant mixture into a plasma flame formed with a gas flow of a plasma-supporting gas selected from the group consisting of oxygen, argon and mixtures thereof, whereby the silicon compound is decomposed and oxidized into silicon dioxide which is molten at the temperature of the plasma flame, and depositing the molten silicon dioxide on a substrate below the plasma flame to form said glass.

2. The method as claimed in claim 1 wherein the vaporizable silicon compound is silicon tetrachloride.

3. The method as claimed in claim 1 wherein the plasma-supporting gas further contains gaseous hydrogen chloride.

* * * * *